Dec. 5, 1933.  H. HUEBER ET AL  1,938,336
WINDSHIELD CLEANER WITH REMOTE CONTROL
Filed Jan. 8, 1930
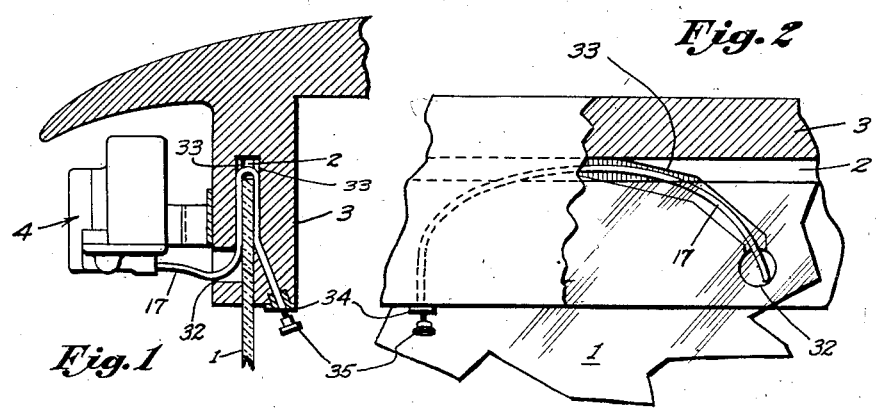
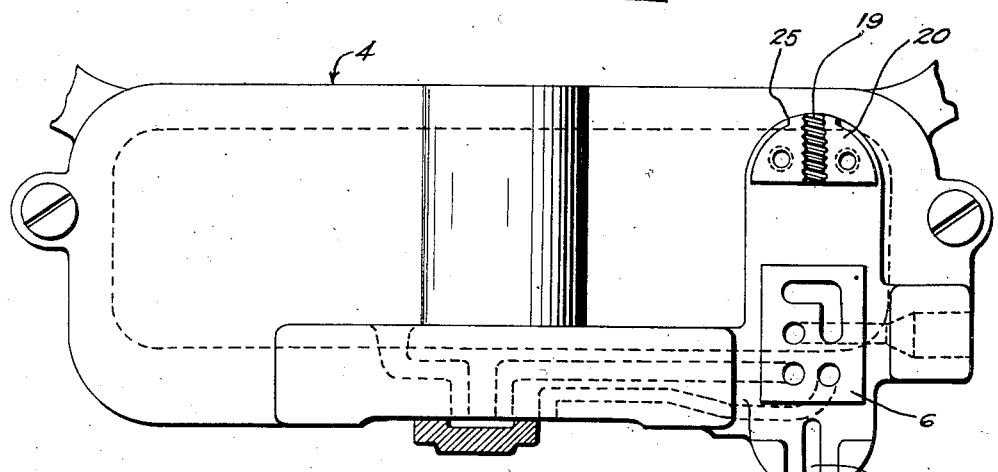
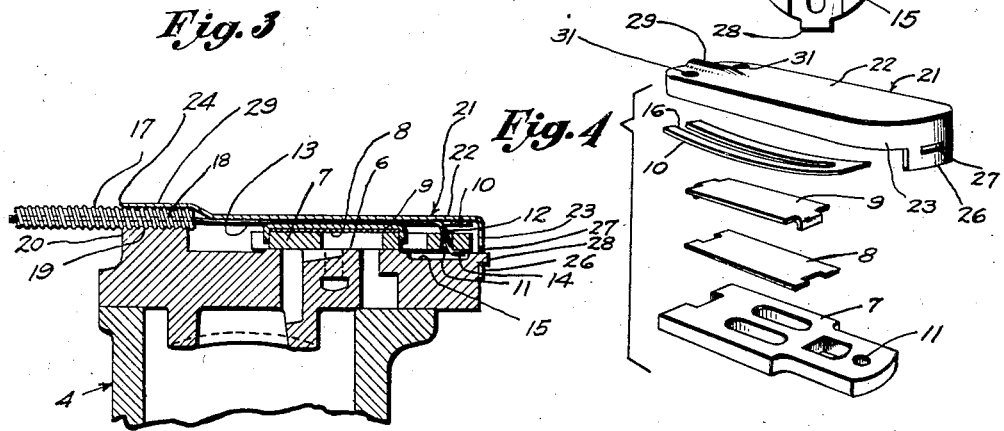
Inventor
Henry Hueber and
Erwin C. Horton
by Barton A. Beaux
Attorney Patented Dec. 5, 1933

1,938,336

UNITED STATES PATENT OFFICE 1,938,336

WINDSHIELD CLEANER WITH REMOTE CONTROL

Henry Hueber, Buffalo, and Erwin C. Horton, Hamburg, N. Y., assignors to Trico Products Corporation, Buffalo, N. Y.

Application January 8, 1930. Serial No. 419,379

9 Claims. (Cl. 296—84)

This invention relates to windshield cleaners and more particularly to the manual control means for the valve of the same.

This invention is particularly applicable to the slide valve structure as shown in the copending application of Henry Hueber, Serial No. 285,246, filed June 14, 1928, and is especially adapted for the control of the same when the windshield cleaner is mounted on the outside of the vehicle.

Prior to this invention outside mounted windshield cleaners have been usually controlled from the dash board, particularly when used in conjunction with the sliding type windshield. It will be understood that this type of windshield is adapted to be raised or lowered into the top frame of the windshield, and that an outside mounted windshield cleaner is mounted on the outside of such frame. The windshield, therefore, in its raised position, lies between the cleaner and the interior of the car, thus obviating any possibility of a direct connection between a valve mounted on the motor of the cleaner to the inside of the vehicle. A separate control has previously been deemed necessary in such case. This arrangement involves a separate valve unit for dash board mounting and the accompanying excess conduit arrangement for connection therewith. Furthermore, the separation of the valve from the motor has resulted in causing a higher cost of production therefor than for the type with the valve included in the motor, because of the obvious extra cost of machining, the use of extra fittings, and generally for the die casting and finishing of an additional part.

The present invention aims to simplify the interior control for the externally disposed cleaner in a manner to overcome the difficulties above referred to.

An object of this invention is to provide a remote control for outside mounted windshield cleaners with unitary valve mechanism, such control means being particularly adapted for use in conjunction with the sliding type windshields.

Another object is to provide a flexible control means for the outside mounted motor in which the inside mounted manual operating means may be mounted at a desired and readily accessible location.

A further object is to provide a novel manner of attaching the control means to the valve.

The invention further resides in the salient features of construction and arrangement of parts hereinafter referred to, reference being had to the accompanying drawing, wherein:—

Fig. 1 is a fragmentary and irregular cross section through a windshield frame showing a windshield cleaner embodying the present improvements mounted thereon.

Fig. 2 is an elevation of a portion of the top windshield frame containing the valve actuating mechanism, a portion of which is broken away to show the interior structure.

Fig. 3 is a bottom view of a preferred type of windshield cleaner with the slide valve and associated portions removed.

Fig. 4 is a perspective view of slide valve, packing member, keeper plate, leaf spring and housing in their relative disassembled relation.

Fig. 5 is a section through the slide valve and associated parts in assembly with the windshield cleaner.

Referring more in detail to the accompanying drawing, the numeral 1 designates a windshield, which for the purpose of clearly illustrating the principle of this invention, is shown as of the sliding type. The windshield is shown in its upper or open position in the receiving groove 2 of the upper windshield frame or header bar 3. A windshield cleaner motor 4 is mounted on the exterior of the frame 3.

The motor 4 is preferably supplied with the improved combined parking and control valve, the functions of which are described in the pending application Serial No. 285,246, and which is herein shown as consisting of a seat 6 upon which is mounted a slide valve 7, the ports of which are closed by a packing member 8 which is located over said ports by a keeper member 9. A leaf spring 10 maintains the said valve against the seat for operation thereon. These parts in the valve and seat assembly are similar in design and operation to the showing in the referred-to pending application, exception being had to the method of connection thereto which involves an important part of the present invention. A flexible connecting member which is connected to the operating valve in the cleaner extends into the said frame and over and around the top of the impeding windshield to the interior of the frame 3, upon which it is mounted for suitable manual control.

The slide valve 7 is provided with an anchor recess 11 adapted to receive an angular hooked extension 12 of a flexible wire 13, said hooked extension projecting downwardly through the said anchor recess and having its terminal 14 impinging upon the bottom of the slide valve. This provides a simple interlock between the valve and the push and pull element or wire 13. The valve seat 6 is provided with a recessed portion 15 for freely receiving the terminal 14. It will be obvious that this assembly provides a simple and secure method of attachment for the wire 13 with the slide valve, which is secured against accidental displacement upon the application of horizontal pressure on the said wire. The flexible wire 13 extends parallel to and over keeper member 9 of the valve assembly upon which it is slidably guided. The leaf spring 10 is provided with a slotted portion 16 for loosely straddling and guiding the said wire, whereby the spring may perform its normal retaining function for the valve assembly without interference from the wire, which extends the length of the valve seat and is received into the flexible tube 17. The end 18 of the said tube is mounted in a serrated semicircular seat 19 provided in the boss 20, the serrations being preferably thread-like depressions matching with the coils or connecting links of the flexible tube 17.

The valve assembly and flexible tube are maintained in their relative positions by a housing 21 which comprises a top 22 and a depending marginal portion 23. A recess 24 is formed by the cutting away of the marginal portion at the rear of the housing, said recess engaging over the shoulder portions 25 of the boss 20. The marginal portion closely follows the contour of the said boss and extends parallel to the sides of the valve seat and forwardly, following the shape of the front of the valve seat. The marginal portion is here provided with a lip 26 containing a rectangular slot 27 engageable over the lug 28 formed on the front end of the valve seat. The top 22 is provided at its rear extremity with a semi-circular raised portion 29 similar in dimensions to the serrated seat 19 and being complemental thereto in providing a neat embrace for the anchorage of the tube 17.

The housing is assembled with the valve seat by so engaging the slotted portion of the housing over the lug 28 as to insert this lug into the slot 27; dropping the housing over the spring and slide valve assembly and in entering the recess 24 on the shoulder portions 25 thus accurately locating the housing against displacement and positioning the complemental seat 29 over the end 18 of the tube 17. The casing is then secured by screws for which screw holes 31 are provided in the said housing, to the boss 20, thus simultaneously clamping the said tube 17 between the serrated seats 19 and 29, and maintaining the leaf spring 10 in its compressed position.

The housing being mounted in close proximity to the wire 13 acts cooperatively with the keeper member 9 to maintainn the said wire against vertical buckling and the slotted portion 16 of the leaf spring 10 similarly acts to prevent horizontal buckling thereof, serving as a guide therefor.

The flexible tube assembly being thus secured to the motor and the valve is therefrom extended rearwardly through the orifice 32 provided in the frame and thence upwardly and around the windshield and through a curved slot 33 to the interior portion of the frame, whereon the flexible tube is secured against displacement in any suitable manner as by means of a collar 34 and the wire projecting therefrom is provided with an attached knob 35 for suitable manual manipulation thereof. In the showing (Fig. 2) the knob 35 is shown displaced laterally from the orifice 32. This is to avoid sharp angles in bending, the tube thereby taking a winding or spiral course about the windshield in the slot 33.

In the operation of the control, the button 35 is pulled outwardly thereby moving the control valve 7 from its parking or off position as shown in Fig. 5 to its forward or operative position. Thus the control valve, by means of the said button and accompanying wire 13, is provided with a remote control of simple design and capable of being carried through an irregular path to a readily accessible location.

What is claimed is:

1. In a windshield cleaner control for automobiles, wherein the automobile is provided with a windshield receivable within its upper frame to its open position, said control comprising in combination, a windshield cleaner motor mounted on said frame exterior of said automobile and provided with a slidable control valve, and flexible means connecting to said valve and extending over and around said windshield in its open position, said means operable for the control of said valve from the interior of said automobile.

2. In an exteriorly mounted windshield cleaner provided with slidable control valve means, an actuator for said valve means mounted on said frame interiorly of said automobile, portions of the windshield extending between the said valve means and the said actuator, and flexible means connecting said valve means to said actuator for operation thereby and extending over and around said portions of the windshield glass.

3. In a windshield cleaner, a control valve actuator, a body having a valve seat, a valve slidable on said seat from an operative to an inoperative position, spring means on said valve for maintaining said valve on said seat, a flexible tube extending from said cleaner and having one end mounted on said body, a flexible wire connected to said valve and extending through said tube, a housing enclosing said valve means and maintaining said spring means in position on said valve, said housing clamping said tube on said body, and means for mounting the opposite end of said tube in the vehicle, the said wire projecting therefrom and connected for manual operation to operate said valve, said spring having means cooperating with the wire to facilitate actuation of the valve.

4. In a windshield cleaner for a vehicle, a control valve actuator, a slidable control valve means exteriorally mounted on said vehicle, a flexible tube mounted on said cleaner and extending therefrom in an irregular path and terminating laterally of said valve in said vehicle, and a manually operable flexible wire connected at one end to said valve means and guided in said tube with its opposite end projecting from said tube for actuating said valve from within said vehicle.

5. In a windshield cleaner control for automobiles, wherein the automobile is provided with a windshield recedable within a slot in its upper frame, said frame provided with an opening extending from the exterior thereof to said slot in said frame and also having grooves in the opposed walls of said slot, the groove in one wall connected with the opening in said frame, said frame having a second opening extending from the companion groove through said inner wall to the interior of the vehicle, a windshield cleaner motor mounted on said frame exteriorly of said automobile and provided with a movable control valve, a flexible tube mounted on said windshield cleaner motor and extending through the orifices and the grooves in said walls, around the windshield and to the interior of the automobile, a flexible wire connected to said control valve and guided in said tube, said wire projecting from said tube at the interior of the vehicle, and means connected to the inner projecting end of said wire for the manual operation of said valve.

6. In a windshield cleaner, a control valve actuator, a valve seat on said cleaner, a control valve operable on said seat, a flat spring mounted on said valve for maintaining said valve on said seat, said flat spring provided with a slotted portion, a flexible operating wire connected to and extending over said valve and through said slotted portion of said flat spring, and a housing provided with a wall for maintaining said flat spring against said valve, said wall acting to prevent displacement of said wire from said slotted portion of said spring and cooperatively positioned therewith to prevent buckling of the wire upon operation thereof.

7. In a windshield cleaner operated by fluid pressure, a valve chamber in said cleaner, a valve therein, a housing for the valve chamber and a remote control for the valve including a flexible push and pull element and a flexible tubing therefor, said tubing being secured at one end to said chamber by said housing.

8. In a windshield cleaner operated by fluid pressure, a valve chamber in said cleaner, a slidable valve therein, a housing for the valve chamber, a remote control for the valve including a flexible push and pull element and a flexible tubing therefor secured at one end to said chamber, said flexible element being extended beyond said tubing and having a terminal interlocked with the valve for operating the same, and means in the valve chamber for guiding said extended portion upon operation thereof.

9. In an automobile header bar having spaced exterior and interior walls and a windshield glass movable therebetween, the combination of a wiper motor exteriorally mounted on the exterior wall, said motor having a movable control valve, a flexible tube, the medial portion of said tube being curved about the upper portion of the windshield glass to permit raising of the latter, means for anchoring the terminals of said tube to said motor adjacent said valve and to said interior wall respectively, said anchoring means cooperating with slots in the inner surfaces of said walls in maintaining said tube in said curve, and a flexible member slidably guided in said tube and operably connected to said valve and to an interior knob, whereby movement of the interior knob is transmitted through the flexible member to the exterior valve to move the latter regardless of the position of the windshield glass between the exterior and interior walls.

HENRY HUEBER.
ERWIN C. HORTON.